US012566757B1

(12) United States Patent
Wang et al.

(10) Patent No.: US 12,566,757 B1
(45) Date of Patent: Mar. 3, 2026

(54) GENERATING AND DETECTING TEXT-TO-STRUCTURED QUERY LANGUAGE USING ADVERSARIAL NETWORKS

(71) Applicant: INTERNATIONAL BUSINESS MACHINES CORPORATION, Armonk, NY (US)

(72) Inventors: Yi Ming Wang, Xian (CN); Rui Han, Xian (CN); Mu Dan Cao, Beijing (CN); Jun Guo, Xian (CN); Sen Liang, Xian (CN); Deng Xin Luo, Xian (CN); Yu Zui You, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/898,734

(22) Filed: Sep. 27, 2024

(51) Int. Cl.
    *G06F 16/2452* (2019.01)
    *G06N 3/092* (2023.01)

(52) U.S. Cl.
    CPC ....... *G06F 16/24522* (2019.01); *G06N 3/092* (2023.01)

(58) Field of Classification Search
    CPC .......................... G06F 16/24522; G06N 3/092
    See application file for complete search history.

(56) References Cited

U.S. PATENT DOCUMENTS

| | | |
|---|---|---|
| 10,825,219 B2 | 11/2020 | Fu et al. |
| 2020/0265331 A1 | 8/2020 | Tashman et al. |
| 2020/0334252 A1 | 10/2020 | Lee |

| | | | | |
|---|---|---|---|---|
| 2023/0126695 A1* | 4/2023 | Hatten | ................... | G06N 3/045 |
| | | | | 706/15 |
| 2025/0086171 A1* | 3/2025 | Kunz | ...................... | G06F 40/40 |
| 2025/0173330 A1* | 5/2025 | Durg | .................... | G06F 16/243 |

FOREIGN PATENT DOCUMENTS

| | | |
|---|---|---|
| CN | 111723937 A | 9/2020 |
| CN | 112559556 B | 5/2021 |
| CN | 108027833 B | 4/2022 |
| CN | 114897163 A | 8/2022 |
| CN | 115238143 A | 10/2022 |
| CN | 116821168 B | 1/2024 |
| CN | 114817295 B | 4/2024 |

OTHER PUBLICATIONS

Hong, Next-Generation Database Interfaces: A Survey of LLM-based Text-to-SQL, pp. 1-18, Jul. 16 (Year: 2024).*

(Continued)

*Primary Examiner* — Albert M Phillips, III

(74) *Attorney, Agent, or Firm* — David K. Mattheis

(57) ABSTRACT

Generating structured query language queries, by extracting database schema from a target database, inputting the database schema into a generative model, training the generative model using a Monte-Carlo method and input data, training a discriminator model to distinguish generated and real input data, determining a loss value for generated input data, further training the generative model using the loss value, receiving, over a network, input text from a user, automatically generating, using the generative model, an output using the input text and providing, over the network, the output to the user.

17 Claims, 2 Drawing Sheets

(56)     References Cited

OTHER PUBLICATIONS

Iacob, Neural Approaches for Natural Language Interfaces to Databases: A Survey, pp. 381-395 (Year: 2020).*

Xiong, Transferable Natural Language Interface to Structured Queries aided by Adversarial Generation, pp. 1-8 (Year: 2018).*

GANs for Synthetic Data Generation, pp. 1-23, (Year: 2022).*

Zhong, SEQ2SQL: Generating Structured Queries From Natural Language Using Reinforcement Learning, pp. 1-12, (Year: 2017).*

Almohaimeed, GAT-SQL: An Advanced Prompt Engineering Approach for Effective Text-to-SQL Interactions, Aug. 8 (Year: 2024).*

Gan et al. "Towards Robustness of Text-to-SQL Models against Synonym Substitution", arXiv:2106.01065, Jun. 19, 2021, 11 pages.

Kelkar et al. "Bertrand-DR: Improving Text-to-SQL using a Discriminative Re-ranker", arXiv:2002.00557, Nov. 3, 2020, 7 pages.

Xiong et al. "Transferable Natural Language Interface to Structured Queries aided by Adversarial Generation", arXiv:1812.01245, Dec. 7, 2018, 8 pages.

Xue et al. "SQLGAN: Adversarial Training Methods for Text-to-SQL Generation", Yale College and Department of Computer Science, Yale University, 2020, 1 page.

International Searching Authority, "Notification of Transmittal of the International Search Report and the Written Opinion of the International Searching Authority, or Declaration," Patent Cooperation Treaty, Jan. 7, 2026, 07 pages, International Application No.—PCT/IB2025/058888.

* cited by examiner

100

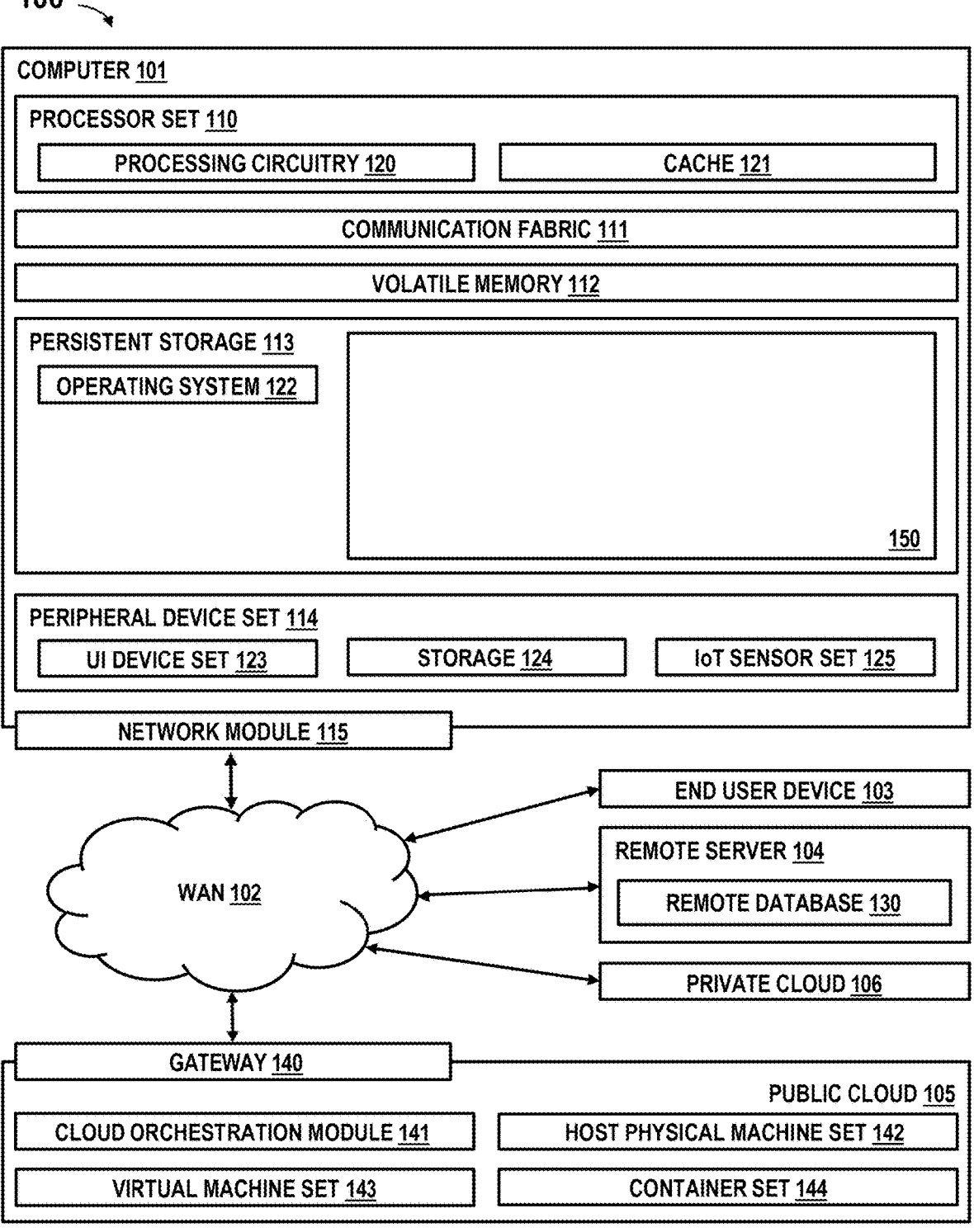

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

Fig. 1

START

EXTRACT DATABASE SCHEMA FROM A TARGET 210

INPUT SCHEMA INTO A GENERATIVE MODEL 220

TRAIN THE GENERATIVE MODEL 230

TRAIN THE DISCRIMINATOR 240

DETERMINE A LOSS VALUE 250

TRAIN THE GENERATIVE MODEL WITH THE LOSS FUNCTION 260

GENERATE SQL OUTPUT FROM INPUT TEXT 270

PROVIDE THE SQL OUTPUT 280

200

GENERATING AND DETECTING TEXT-TO-STRUCTURED QUERY LANGUAGE USING ADVERSARIAL NETWORKS

FIELD OF THE INVENTION

The disclosure relates generally to the automated generation of structured-query-language (SQL) strings. The disclosure relates particularly to the automated generation of SQL queries from text input.

BACKGROUND

Text-to-SQL is a research direction in the field of natural language processing (NLP), designed to convert natural language queries into Structured Query Language (SQL) through deep learning models for direct database manipulation. This task is important for achieving natural and efficient database queries, and also has wide practical application value. Traditional Text-to-SQL methods first require collecting data sets with natural language questions and corresponding SQL queries, and manually annotating them. Then, extracting features of natural language problems, such as word embeddings, parts of speech, named entity recognition, and extract features from databases (tables, columns, relationships, etc.). Then the natural language questions input by the user are converted into intermediate expressions or decoded into SQL queries through the trained model through the NLP model.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable automated generation of SQL queries from input text.

Aspects of the invention disclose methods, systems and computer readable media associated with generating structured query language queries, by extracting database schema from a target database, inputting the schema into a generative model, training the generative model using a Monte-Carlo method and input data, training a discriminator model to distinguish generated and real input data, determining a loss value for generated input data, further training the generative model using the loss value, receiving, over a network, user input text, automatically generating, using the generative model, an output using the text as input and providing, over the network, the output to the user.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 1 provides a schematic illustration of a computing environment, according to an embodiment of the invention.

DETAILED DESCRIPTION

Figure 2:
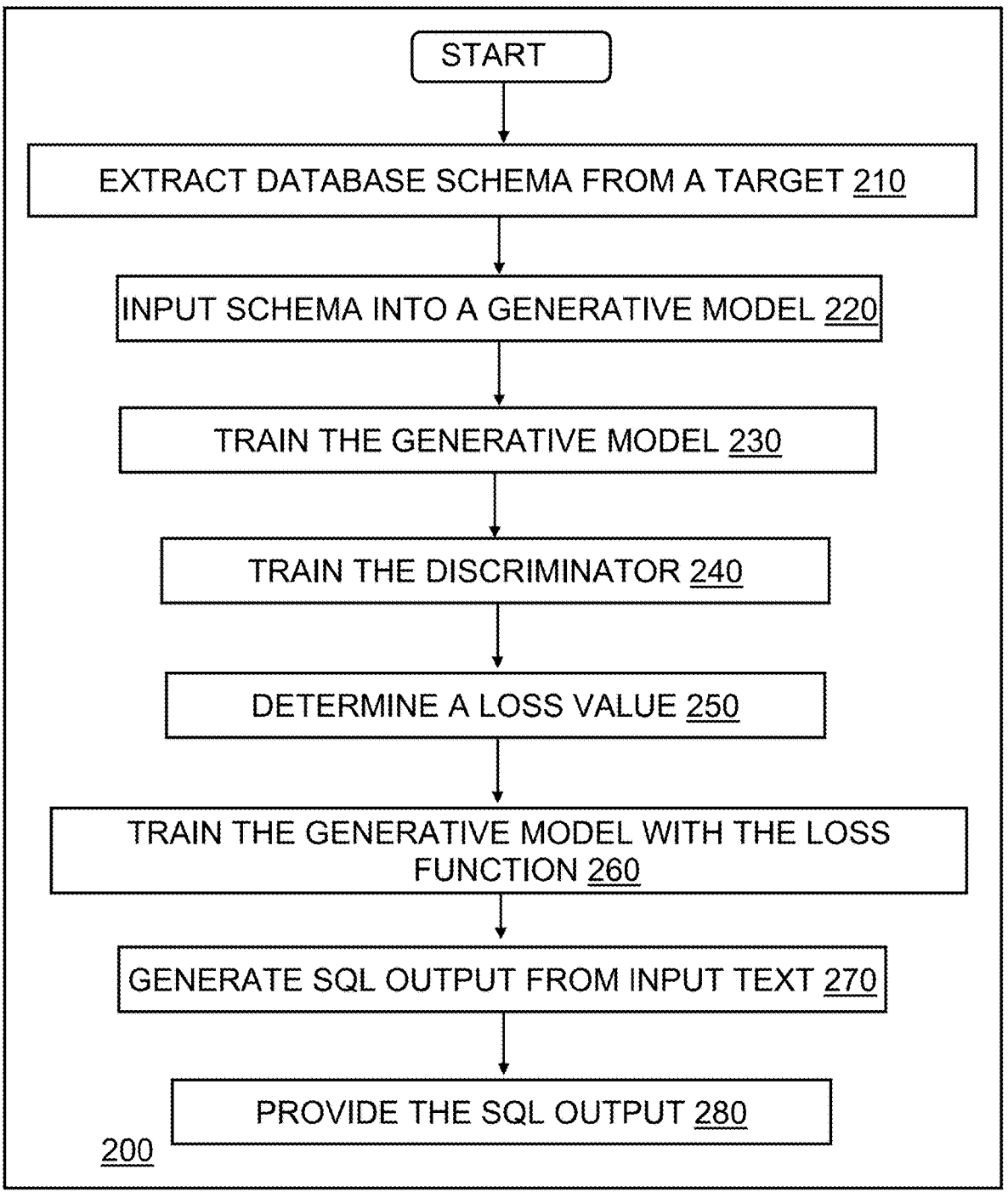
FIG. 2 provides a flowchart depicting an operational sequence, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Large Language models enable the generation of SQL statements from input text. Disclosed methods, systems and computer program products enable the evaluation of the quality of the generated SQL statements, and for provide accurate generative models tailored to specific circumstances.

Clause 1: A computer implemented method for generating structured query language queries, the method comprising: extracting database schema from a target database; inputting the schema into a generative model; training the generative model using a Monte-Carlo method; training a discriminator model to distinguish generated and real input data; determining a loss value for generated input data; training the generative model using the loss value; receiving, over a network, user input text; automatically generating, using the generative model, an output using the text as input; and providing, over the network, the output to the user, provides the advantages of using adversarial networks to learn the correspondence between user query, SQL statements and data results without the need for setting labels regarding the query language in advance of training.

Clause 2: The computer implemented method according to clause 1, further comprising: receiving, over the network, a query; determining, by the discriminator model, a status of the query; and providing, over the network, the status to the user. This provides the advantage of determining the effectiveness of model generated SQL statements.

Clause 3: The computer implemented method according to clause 1 or 2, wherein the output comprises an SQL query, a table schema, and data information. This provides the advantage of including the SQL statement as well as associated table and data information in the provided output generated from user input texts.

Clause 4: The computer implemented method according to any one of clauses 1 to 3, wherein determining a loss value for generated input data comprises: receiving incomplete generated input data from a temporary generative model; generating a plurality of remainder data to yield a plurality of completed generated input data; evaluate each of the plurality of completed generated input data; determining a reward value for each of the completed generated input data according to the evaluation; determining an expectation of reward values according to the reward values for the plurality of completed generated input data as a loss function value; and updating temporary generative model parameters according to the loss function value. This provides the advantage of providing training data derived for a sequence of generated tokens, each member of the sequence completed by generating the necessary remainder data to complete the desired output string. These steps enable the training of a adapted network from an original pre-trained large language model (LLM). The adaptation alters the generating capabilities of the LLM (large language model) to specific customer scenarios using user provided input data through the use of a temporary model and the generation of incomplete outputs by that model.

Clause 5: The computer implemented method according to any of the preceding clauses, further comprising: updating the generative model parameters using the temporary generative model parameters; receiving complete input data from the generative model;

evaluating the complete input data using the discriminator model, yielding a loss function value;

and updating the generative model parameters according to the loss function value. This provides the advantage of utilizing a generative model adapted to generate complete output strings which are passed to the discriminator, generating loss function values then used for refining the training of the generative model.

Clause 6: The computer implemented method according to any of the preceding clauses, wherein training a discriminator model to distinguish generated and real input data comprises: applying a first label to real input data; applying a second label to generated input data; merging labeled real input data and labeled generated input data into a common dataset; providing the common dataset as input to the discriminator model yielding a set of results; determining loss function values according to the set of results and the respective labels of the common dataset; and updating the discriminator model parameters according to the loss function values. This provides the advantage of using the trained generative model in generating fake input data for use in training the discriminator model.

Clause 7: The computer implemented method according to any of the preceding clauses, wherein training the generative model comprises: receiving a training epoch threshold value from a user over the network; and training the generative model for the threshold number of epochs. This provides the advantage of enabling a user to set a training epoch threshold for training the generative model, according to model training or other experience.

Clause 8: A computer program product for generating structured query language queries, the computer program product comprising one or more computer readable storage media and collectively stored program instructions on the one or more computer readable storage media, the stored program instructions which, when executed, cause one or more computer processors to provide a method including: extracting database schema from a target database; inputting the schema into a generative model; training the generative model; training a discriminator model to distinguish generated and real input data; determining a loss value for generated input data; training the generative model using the loss value; receiving, over a network, user input text; automatically generating, using the generative model, an output using the text as input; and providing, over the network, the output to the user, provides the advantages of using adversarial networks to learn the correspondence between query statements and data results without the need for setting labels regarding the query language in advance of training.

Clause 9: The computer program product according to clause 8, further comprising:

receiving, over the network, a query; determining, by the discriminator model, a status of the query; and providing, over the network, the status to the user. This provides the advantage of determining the effectiveness of model generated SQL statements.

Clause 10: The computer program product according to clause 8 or 9, wherein the output comprises an SQL query, a table schema, and data information. This provides the advantage of including the SQL statement as well as associated table and data information in the provided output generated from user input texts.

Clause 11: The computer program product according to any of clauses 8-10, wherein determining a loss value for generated input data comprises: receiving incomplete generated input data from a temporary generative model; generating a plurality remainder data to yield a plurality of completed generated input data; evaluating each of the plurality of completed generated input data; determining a reward value for each of the completed generated input data according to the evaluation; determining an expectation of reward values according to the reward values for the plurality of completed generated input data as a loss function value; and updating temporary generative model parameters according to the loss function value. This provides the advantage of providing training data derived for a sequence of generated tokens, each member of the sequence completed by generating the necessary remainder data to complete the desired output string. These steps enable the training of a adapted network from an original pre-trained large language model (LLM). The adaptation alters the generating capabilities of the LLM (large language model) to specific customer scenarios using user provided input data through the use of a temporary model and the generation of incomplete outputs by that model.

Clause 12: The computer program product according to any of clauses 8-11, further comprising: updating the generative model parameters using the temporary generative model parameters; receiving complete input data from the generative model; evaluating the complete input data using the discriminator model, yielding a loss function value; and updating the generative model parameters according to the loss function value. This provides the advantage of utilizing a generative model adapted to generate complete output strings which are passed to the discriminator, generating loss function values then used for refining the training of the generative model.

Clause 13: The computer program product according to any of clauses 8-12, wherein training a discriminator model to distinguish generated and real input data comprises: applying a first label to real input data; applying a second label to generated input data; merging labeled real input data and labeled generated input data into a common dataset; providing the common dataset as input to the discriminator model yielding a set of results; determining loss function values according to the set of results and the respective labels of the common dataset; updating the discriminator model parameters according to the loss function values. This provides the advantage of using the trained generative model in generating fake input data for use in training the discriminator model.

Clause 14: The computer program product according to any of clauses 8-13, wherein training the generative model comprises: receiving a training epoch threshold value from a user over the network; and training the generative model for the threshold number of epochs. This provides the advantage of enabling a user to set a training epoch threshold for training the generative model, according to model training or other experience Clause 15: A computer system for generating structured query language queries, the computer system comprising: one or more computer processors, one or more computer readable storage media; and stored program instructions on the one or more computer readable storage media for execution by the one or more computer processors, the stored program instructions which, when executed, cause one or more computer processors to provide a method including: extracting database schema from a target database; inputting the schema into a generative model;

training the generative model using a Monte-Carlo method; training a discriminator model to distinguish generated and real input data; determining a loss value for generated input data;

training the generative model using the loss value; receiving, over a network, user input text;

automatically generating, using the generative model, an output using the text as input; and providing, over the network, the output to the user, provides the advantages of using adversarial networks to learn the correspondence between query statements and data results without the need for setting labels regarding the query language in advance of training.

Clause 16: The computer system according to clause 15, further comprising: receiving, over the network, a query; determining, by the discriminator model, a status of the query; and providing, over the network, the status to the user. This provides the advantage of determining the effectiveness of model generated SQL statements.

Clause 17: The computer system according to clause 15 or 16, wherein the output comprises an SQL query, a table schema, and data information. This provides the advantage of including the SQL statement as well as associated table and data information in the provided output generated from user input texts.

Clause 18: The computer system according to any of clauses 15-17, wherein determining a loss value for generated input data comprises: receiving incomplete generated input data from a temporary generative model; generating a plurality remainder data to yield a plurality of completed generated input data; evaluate each of the plurality of completed generated input data; determining a reward value for each of the completed generated input data according to the evaluation; determining an expectation of reward values according to the reward values for the plurality of completed generated input data as a loss function value; and updating temporary generative model parameters according to the loss function value. This provides the advantage of providing training data derived for a sequence of generated tokens, each member of the sequence completed by generating the necessary remainder data to complete the desired output string. These steps enable the training of a adapted network from an original pre-trained large language model (LLM). The adaptation alters the generating capabilities of the LLM (large language model) to specific customer scenarios using user provided input data through the use of a temporary model and the generation of incomplete outputs by that model.

Clause 19: The computer system according to any of clauses 15-18, further comprising: updating the generative model parameters using the temporary generative model parameters; receiving complete input data from the generative model; evaluating the complete input data using the discriminator model, yielding a loss function value; and updating the generative model parameters according to the loss function value. This provides the advantage of utilizing a generative model adapted to generate complete output strings which are passed to the discriminator, generating loss function values then used for refining the training of the generative model.

Clause 20: The computer system according to claim 15, wherein training a discriminator model to distinguish generated and real input data comprises: applying a first label to real input data; applying a second label to generated input data; merging labeled real input data and labeled generated input data into a common dataset; providing the common dataset as input to the discriminator model yielding a set of results; determining loss function values according to the set of results and the respective labels of the common dataset; updating the discriminator model parameters according to the loss function values. This provides the advantage of using the trained generative model in generating fake input data for use in training the discriminator model.

Aspects of the present invention relate generally to SQL generation and evaluation systems and, more particularly, to unsupervised training of generation and evaluation models. In embodiments, an adversarial generation/discrimination system proceeds with extracting database schema from a target database, inputting the schema into a generative model, training the generative model using a Monte-Carlo method and input data, training a discriminator model to distinguish generated and real input data, determining a loss value for generated input data, further training the generative model using the loss value, receiving, over a network, user input text, automatically generating, using the generative model, an output using the text as input and providing, over the network, the output to the user. In this manner, implementations of the invention learn and continually train the generative and discriminator models enabling remotes users to provide input text and receive generated SQL statements, or evaluation of input SQL statements, from the most recently trained models In accordance with aspects of the invention a method provides the automatic unsupervised training of generation and evaluation models. In embodiments, an adversarial generation/discrimination training method proceeds with extracting database schema from a target database, inputting the schema into a generative model, training the generative model using a Monte-Carlo method and input data, training a discriminator model to distinguish generated and real input data, determining a loss value for generated input data, further training the generative model using the loss value, receiving, over a network, user input text, automatically generating, using the generative model, an output using the text as input and providing, over the network, the output to the user. In this manner, implementations of the methods of the invention learn and continually train the generative and discriminator models, providing those up-to-date models, thereby enabling remotes users to provide input text and receive generated SQL statements, or evaluation of input SQL statements, from the most recently trained models.

Aspects of the invention provide an improvement in the technical field of automatic unsupervised training of generation and evaluation models. In embodiments, an adversarial generation/discrimination training method proceeds with extracting database schema from a target database, inputting the schema into a generative model, training the generative model using a Monte-Carlo method and input data, training a discriminator model to distinguish generated and real input data, determining a loss value for generated input data, further training the generative model using the loss value, receiving, over a network, user input text, automatically generating, using the generative model, an output using the text as input and providing, over the network, the output to the user. In this manner, implementations of the methods of the invention learn and continually train the generative and discriminator models, providing those up-to-date models, thereby enabling remotes users to provide input text and receive generated SQL statements, or evaluation of input SQL statements, from the most recently trained models Aspects of the invention also provide an improvement to computer functionality. In particular, implementations of the invention are directed to a specific improvement to the way adversarial generative/discriminator systems operate, embodied in the automatic unsupervised training of generation and evaluation models. In embodiments, an adversarial generation/discrimination training method proceeds with extracting database schema from a target database, inputting the schema into a generative model, training the generative model using a Monte-Carlo method and input data, training a discriminator model to distinguish generated and real input data, determining a loss value for generated input data, further training the generative model using the loss value, receiving, over a network, user input text, automatically generating, using the generative model, an output using the text as input and providing, over the network, the output to the user. In this manner, implementations of the methods of the invention learn and continually train the generative and discriminator models, providing those up-to-date models, thereby enabling remotes users of the computer systems to provide input text and receive generated SQL statements, or evaluation of input SQL statements, from the most recently trained models.

As an overview, a generative adversarial network includes a generator module and a discriminator module. Provided with a prompt, a pre-trained large language model of the generative module generates an output complying with the prompt. The output of the generative module may be evaluated by the discriminator module to ascertain whether the output represents a real input for the discriminator, an input which was not generated by the generative module, or a fake input, an input which was generated by the generative module. Training of the GAN modules proceeds until the discriminator cannot reliably distinguish between real and fake input data.

Disclosed embodiments begin with a pre-trained LLM and then adapt that model using data specific to the intended use of the final model. Specifically, systems and methods table schema data for a database and utilize this table schema data as input data in adapting the pre-trained LLM for the intended purpose of generating SQL statements from input text as well as providing a discriminator for evaluating SQL texts generated by LLMs. Disclosed embodiments learn generative token generation and generate a sequence of tokens from an initial input starting with an initial token and increasing the length of the token sequence until reaching the complete output token sequence. In one embodiment, the complete output token sequence comprises a format of SQL string, plus table schema information from the database, plus data from the databases satisfying the SQL and complying with the table schema. At each stage of generation up to the complete token sequence, embodiments generate remainder data to complete the output string from the generative module. These generated tokens plus generated remainder data strings are then evaluated using the discriminator module. After training the generative module satisfies a threshold requirement, embodiments proceed with the training of the discriminator module, using real inputs and fake generated inputs and holding the generative module parameters as fixed. Once trained, the generative and discriminatory modules may be provided to remote users for the generation and evaluation of SQL statements. User inputs and generated outputs may be used to continuously continue the training of the modules.

In one embodiment, SQL inputs generated by an LLM are provided as input to the trained discriminator. In this embodiment, the trained discriminator provides an output indicating the quality of the provided SQL input as well as an indicator of the quality of the generative model which produced the SQL input. Poor quality inputs are evaluated as false, or as fake inputs, while high quality inputs are evaluated to an output of true, or real SQL inputs.

In an embodiment, one or more components of the system can employ hardware and/or software to solve problems that are highly technical in nature (e.g., extracting database schema from a target database, inputting the schema into a generative model, training the generative model using a Monte-Carlo method and input data, training a discriminator model to distinguish generated and real input data, determining a loss value for generated input data, further training the generative model using the loss value, receiving, over a network, user input text, automatically generating, using the generative model, an output using the text as input, providing, over the network, the output to the user, etc.). These solutions are not abstract and cannot be performed as a set of mental acts by a human due to the processing capabilities needed to facilitate endpoint device remediation, for example. Further, some of the processes performed may be performed by a specialized computer for carrying out defined tasks related to generating and evaluating SQL statements. For example, a specialized computer can be employed to carry out tasks related to the generation and evaluation of SQL statements, and the like.

When considering Text2SQL type problems, methods may generate SQL statements directly. In real scenarios, there will be prior knowledge, such as SQL table schema information and query result data information, which also have an impact on SQL generation. For example, the 'name' column in the query is of type String, not type Integer. In the process of generating SQL for large models, the type attributes of columns need to be considered. In addition, the distribution of real data also has guiding significance for SQL. For example, the name column type is generally 3-5 characters, while the percentage type column distributes multiple values between 0-1. In order to make better use of this information to assist SQL generation, disclosed embodiments add this prior knowledge to the generation process by changing the generation result from traditional SQL, to text that generates SQL+table schema+data, so as to better generate specific SQL for the instant scenario. In addition, embodiments use the idea of generative adversarial networks to achieve unsupervised Text2SQL generation and detection.

This mainly includes: (i) Data preprocessing: to extract some Schema information in the database, as the model's prior knowledge, and input it into the model. During the extraction, the database schema information and the corresponding table information will be extracted, such as the database type: mysql, pg, oracle, etc.; the DB version: SQL V5.0, v2.1;DB keyword: Select, Table, From, LIMIT, . . . and the table schema information of the database table: table name, each field name, the data type corresponding to each field, table-column relations, etc. (ii) SQL generation: to generate text strings as similar to real SQL+table schema+ data, as possible; and (iii) SQL discrimination: to distinguish between real sample data and model-generated data as accurately as possible.

In the SQL generation model, embodiments use a reinforcement learning method to learn for each token generated during training. For each generated token, Monte Carlo methods generate the remainder data needed to append to the token to yield a complete output string such as SQL+ table schema+data. Embodiments then evaluate the completed output using the discriminator and determine a reward value as the product of the discriminator output, 1 or 0, and the defined reward value for the reinforcement learning algorithm.

In a non-limiting example:

The last generated complete token (current state) is:

Select username, location from table

The latest generated next token is: 1, and the state after adding the latest generated token is:

Select username, location from table 1

However, this string cannot be input into the discriminator, because the discriminator only receives complete generation results. Embodiments then use the Monte Carlo method to supplement the current state into a complete generation result through multiple sampling methods. For example, for sampling set to 3 times:

After the first sampling supplement

Select username, location from table 1<SPLIT> text1,String,location,String<SPLIT> username, location zhangsan,xian<EOF>

After the Second sampling

Select username, location from table 1<SPLIT> text2,String, age,String<SPLIT> username, 13 zhangsan, 12<EOF>

After the Third sampling

Select username, location from table 1<SPLIT> text2,String, age,String<SPLIT> username, location lisi,beijing<EOF>

The results of these three iterations are input to the discriminator (because they have been supplemented to complete input through sampling, they can be input to the discriminator), and the discriminator will score the three sampling results: first sampling: 1, second sampling: 0, third sampling: 1. Then the score of the latest generated next token: 1 is obtained by the average of the scores of these three samples (0.66). In actual use, embodiments generate a large number of samples, exceeding the 3 samples of this example.

In one embodiment, embodiments then calculate an expectation of rewards for all sampled data as the combination of the rewards for each individual sampled data point. Embodiments then feed the expectation of rewards back to the SQL generation model for further training of the model using back-propagation gradient descent and the expectation as the loss function value. When embodiments generate the complete output the SQL file discrimination model calculates a loss on the complete output results and feeds that loss back to the SQL generation model for training.

By continuously searching for and utilizing training iterations to train the SQL generation model and the SQL file discrimination model, when the two models reach Nash equilibrium, (i.e. when each of the generative model and the discriminator model have achieved optimal results), embodiments obtain a good SQL generation model to generate SQL based on user input text.

Data preprocessing organizes prior knowledge about an SQL database and search results, and inputs it into the subsequent model. Embodiments include at least the steps of:

1. Constructing a Real SQL Structure: Using a database and real SQL statements to add Schema information and Real data information to the SQL generative module to generate Real SQL data. Embodiments subsequently provide the Real SQL data as input to a Discriminator module. And, 2. Constructing a prompt, as the prompt for the Generator pre-training model. Steps include: 2.1 Extracting the schema information in the database (such as table name, column name, main external structure of the table, blood relationship between the table and the column, value range of the numerical column, etc.), 2.2 Extracting database keywords, such as (SELECT, FROM, TABLE, . . . ), and, 2.3. Using the extracted table names, column names, and database keywords as supplementary vocabulary and as prompt information for the next generation model (helping the model understand domain information). In one embodiment, providing the supplementary vocabulary to the model includes using a fixed prefix of the model input string, and concatenating the schema (including the Supplementary vocabulary) and prompt information with the user input into a large string which is then input into the generation model.

In one embodiment, the generator mainly includes a Pretrained-LLM and an Adapter network. The pre-trained LLM provides access to the powerful generation capabilities of existing large models. In this embodiment, training the Adapter network enables adapting the LLM generation capabilities to specific customer scenarios. The training process of the Adapter generator model is divided into two stages: a rollout stage and a synchronization stage.

The generation module of a large model does not generate all data in a single iteration. but generates a new Token each iteration based on the current Token. The module then generates the next Token based on the new current Token. This is a discontinuous process, and the generation of each Token has a huge impact on the overall effect, i.e. the complete generation result. In one embodiment, the discriminator model receives the complete generation result as its input, not the current Token generation result. In one embodiment, methods abstract the generation process of each Token into a status point. Then in each state, the Monte Carlo method is used to generate the completed Fake SQL information of the current state based on random sampling of the current state. As used herein, "Fake" refers to data that is an output of the generative module. Therefore, as the generative module generates a sequence of tokens, each token of the sequence building upon the previous token, methods use Monté Carlo methods to generate the remainder data necessary to complete each token of the sequence. This results in a set of completed outputs, each output comprising a generated token and the remainder data necessary to complete that output.

In one embodiment, the rollout stage includes the steps: 1) Generate a backup of the latest Generator model network—a temporary Generator network, (G'), and set the temporary Generator network to only generate part of the data at a time according to the state (for example, according to the character Token, only one Token is generated at a time, leading to a sequence of Tokens, each token of the sequence based upon the previous token of the sequence, each token constituting only a portion of the desired output of SQL+table schema+data). 2) Based on the current state (such as State) the Generator model (G') generates partial outputs but does not generate complete Fake SQL data outputs). Embodiments evaluate the quality of each Token the model generates in the sequence.

For that evaluation, methods use a Monte Carlo method to randomly sample available data and generate multiple pieces of the most likely specific data information necessary to complete the current output token. After appending to the text to that current output Token based on the current state, embodiments yield multiple pieces of complete Fake SQL sampling data. 3) Use the latest SQL discriminator to distinguish each of the multiple pieces of complete Fake SQL sampling data and obtain the discrimination results for each piece of the Fake SQL data. 4) Calculate a Reinforcement Learning method reward value of each sampling data based on the discrimination results. The reward may then be multiplied by the 0 (false) or 1 (true) value from the discriminator to determine the reward for each piece of sampling data. 5) Calculate the expectation of reward values for all sampling data by combining the values from each piece of sampling data evaluated by the discriminator. And, 6) Use expectations to train the temporary Generator Adapte network (G').

Training the generative models includes using the respective discriminator values for the Fake SQL sampling data and back-propagation gradient descent in modifying model network node weight parameters until the disseminator's evaluation of the sampling data satisfies a pre-set threshold for generator performance in generating Fake SQL sampling data. In one embodiment, the threshold may be 50% such that the threshold is satisfied when the discriminator classifies half of the generated Fake SQL sampling data as Real, and half of the sampling data as Fake. Embodiments repeat steps 2-6 until the Tokens output by the generative model include complete Fake SQL data, these output Tokens do not require the addition of Monte Carlo generated remainder data before being evaluated by the discriminator model.

The synchronization stage follows the completion of the rollout stage. In the synchronization stage, as (G') generates complete output data without Monte Carlo generated data being added. At this point, 1) the parameters of the temporary generative model are used to update the parameters of the Generative Adaptive Network (A). 2) Embodiments then use (A) to generate complete Fake SQL output information. 3) Pass the generated Fake SQL information to the current version of the Discriminator model, generating discriminator loss value outputs. 4) Use the discriminator loss value outputs to continue training (A) until the pre-set performance threshold for generated results is me as described above.

Having trained the generative model to a point of satisfying the performance threshold, or after the number of training epochs for the generative model reaches a training epoch threshold, such as 100 epochs of training, embodiments proceed with training the Discriminator model as the complete outputs of the generative model may now deceive the discriminator model.

In one embodiment, training includes: 1) Setting a label of real data to 1 and a label of the fake data generated by the latest generative network Generator (A) to 0.2) Merging the Real data and the Fake data and inputting the merged labeled real data and labeled fake data into the discriminative network Discriminator at the same time, and training the Discriminative network Discriminator based on the accuracy of the results using a loss function together with gradient descent back-propagation.

In one embodiment, during the process of a generative model training, the discriminative model is fixed. In contrast, when training a discriminative model, the generative model is fixed. Therefore, one training session will not enable the generative model and the discriminative model to learn from each other and reach an equilibrium state (i.e., Nash equilibrium, when both the discriminative model and the generative model achieve optimal results). In this embodiment, a user may manually set the number of training epochs to approach the equilibrium state of the generative model and the discriminative model as closely as possible through multiple trainings. In practice, users may adjust the training epochs threshold based on the results generated by the discriminator. Training the generative model Generator and the discriminative model Discriminator, until the number of training times reaches the specified threshold yields Generative models which can generate query data based on user input for downstream report generation and other tasks, and Discriminative models which can be used to evaluate the effectiveness of SQL statements generated by other third-party LLM generative models.

As shown in FIG. 1, computing environment 100 contains an example of an environment for the execution of at least some of the computer code involved in performing the inventive methods, such as training and providing generative and discriminatory modules 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 provides a flowchart 200, illustrating exemplary activities associated with the practice of the disclosure. After program start, at step 210, the SQL generative and discriminative model training software extracts schema from a target database which includes SQL data. Schema may include elements such as: Table Name: user, role, client, . . . . Column Name: username, age, location, . . . table-column relations; (username,belongto, user), (location,belongto, user), . . . (id,belongto, role), . . . , (role_name,belongto, role), . . . range of column: (age, [0,100]), . . . .

In one embodiment, embodiments may utilize the extracted schema in constructing prompts for submission to the generative model: Example Prompt:

Table: user, role, client, . . . .

column: username, age, location, . . . .

DB keyword: Select, Table, From, LIMIT, . . . .

DB version: SQL V5.0

In this embodiment, at step 220, the extracted schema and prompts are input to the Adapted generative model as part of the training for the temporary generative model for the next generation of the model.

At step 230, SQL generative and discriminative model training software trains the generative model by generating Tokens which are less that complete outputs, generating remainder data to complete each incomplete output Token using Monte Carlo generation, then evaluating the combination of generated Token and remainder data as complete outputs using the discriminator model., The software then uses loss function values from the evaluation to adapt the parameters of the generative model network node weights to reduce the loss function value from the evaluation.

At step 240, after training the generative model to a defined threshold of performance against a discriminator, or until a defined number of training epochs have been conducted, the method of SQL generative and discriminative model training software trains the discriminator model using a combined dataset including Fake SQL data from the trained generator model as well as Real SQL data provided by the user. Methods utilize data labeled as either fake or real and associated discriminator outputs in a loss function together with gradient descent back-propagation to adjust the network node weights of the discriminator model.

At step 250, after sufficiently training the discriminator, to either a defined performance level or through a defined number training epochs, the method of SQL generative and discriminative model training software utilizes the trained generator and trained discriminator to further refine the training of the generative model by providing generated outputs to the discriminator and utilizing the outputs in determining a loss function value. Then at step 260, utilizing the loss function value, with gradient descent back-propagation to further refine the node weights of the generative model network nodes.

At step 270, SQL generative and discriminative model training software receives user input for an SQL request and generates an output of the form SQL+table schema+data.

At step 280, SQL generative and discriminative model training software, provides the generated output to the user over the network utilizing a display element of the user's device.

It is to be understood that although this disclosure includes a description on cloud computing, implementation of the teachings recited herein are not limited to a cloud computing environment. Rather, embodiments of the present invention are capable of being implemented in conjunction with any other type of computing environment now known or later developed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, or media, as those terms are used in the present disclosure, explicitly excludes storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage medium or device as transitory because the data is not transitory while it is stored.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

extracting database schema from a target database;

inputting the database schema into a generative model;

training the generative model using a Monte-Carlo method;

training a discriminator model to distinguish generated and real input data by;

fixing parameters of the generative model;

applying a first label to real input data;

applying a second label to generated input data;

merging the labeled real input data and the labeled generated input data into a common dataset;

providing the common dataset as input to the discriminator model yielding a set of results;

determining loss function values according to the set of results and the respective labels of the common dataset; and updating discriminator model parameters according to the loss function values;

determining a loss value for generated input data;

training the generative model using the loss value model;

receiving, over a network, input text from a user;

automatically generating, using the generative model, an output using the input text; and providing, over the network, the output to the user.

2. The computer implemented method according to claim 1, further comprising:

receiving, over the network, a query;

determining, by the discriminator model, a status of the query; and providing, over the network, the status to the user.

3. The computer implemented method according to claim 1, wherein the output comprises an SQL query, a table schema, and data information.

4. The computer implemented method according to claim 1, wherein determining a loss value for generated input data comprises:

receiving incomplete generated input data from a temporary generative model;

generating a plurality of remainder data to yield a plurality of completed generated input data;

evaluating each of the plurality of completed generated input data;

determining a reward value for each of the completed generated input data according to the evaluation;

determining an expectation of reward values according to the reward values for the plurality of completed generated input data as a loss function value; and updating temporary generative model parameters according to the loss function value.

5. The computer implemented method according to claim 1, further comprising:

updating generative model parameters using temporary generative model parameters;

receiving complete input data from the generative model;

evaluating the complete input data using the discriminator model, yielding a loss function value; and updating the generative model parameters according to the loss function value.

6. The computer implemented method according to claim 1, wherein training the generative model comprises:

receiving a training epoch threshold value from a user over the network; and training the generative model for the training epoch threshold value number of epochs.

7. A computer program product for generating structured query language queries, the computer program product comprising one or more computer readable storage media and collectively stored program instructions on the one or more computer readable storage media, the stored program instructions which, when executed, cause one or more computer processors to provide a method including:

extracting database schema from a target database;

inputting the database schema into a generative model;

training the generative model using a Monte-Carlo method;

training a discriminator model to distinguish generated and real input data by;

fixing parameters of the generative model;

applying a first label to real input data;

applying a second label to generated input data;

merging the labeled real input data and the labeled generated input data into a common dataset;

providing the common dataset as input to the discriminator model yielding a set of results;

determining loss function values according to the set of results and the respective labels of the common dataset; and updating discriminator model parameters according to the loss function values;

determining a loss value for generated input data;

training the generative model using the loss value yielding a revised generative model;

receiving, over a network, input text from a user;

automatically generating, using the revised generative model, an output using the input text; and providing, over the network, the output to the user.

8. The computer program product according to claim 7, further comprising:

receiving, over the network, a query;

determining, by the discriminator model, a status of the query; and providing, over the network, the status to the user.

9. The computer program product according to claim 7, wherein the output comprises an SQL query, a table schema, and data information.

10. The computer program product according to claim 7, wherein determining a loss value for generated input data comprises:

receiving incomplete generated input data from a temporary generative model;

generating a plurality of remainder data to yield a plurality of completed generated input data;

evaluating each of the plurality of completed generated input data;

determining a reward value for each of the completed generated input data according to the evaluation;

determining an expectation of reward values according to the reward values for the plurality of completed generated input data as a loss function value; and updating temporary generative model parameters according to the loss function value.

11. The computer program product according to claim 7, further comprising:

updating generative model parameters using temporary generative model parameters;

receiving complete input data from the generative model;

evaluating the complete input data using the discriminator model, yielding a loss function value; and updating the generative model parameters according to the loss function value.

12. The computer program product according to claim 7, wherein training the generative model comprises:

receiving a training epoch threshold value from a user over the network; and training the generative model for the training epoch threshold value number of epochs.

13. A computer system for generating structured query language queries, the computer system comprising:

one or more computer processors;

one or more computer readable storage media; and stored program instructions on the one or more computer readable storage media for execution by the one or more computer processors, the stored program instructions which, when executed, cause one or more computer processors to provide a method including:

extracting database schema from a target database;

inputting the database schema into a generative model;

training the generative model using a Monte-Carlo method;

training a discriminator model to distinguish generated and real input data by;

fixing parameters of the generative model;

applying a first label to real input data;

applying a second label to generated input data;

merging the labeled real input data and the labeled generated input data into a common dataset;

providing the common dataset as input to the discriminator model yielding a set of results;

determining loss function values according to the set of results and the respective labels of the common dataset; and updating discriminator model parameters according to the loss function values;

determining a loss value for generated input data;

training the generative model using the loss value model;

receiving, over a network, input text from a user;

automatically generating, using the generative model, an output using the input text; and providing, over the network, the output to the user.

14. The computer system according to claim 13, further comprising:

receiving, over the network, a query;

determining, by the discriminator model, a status of the query; and providing, over the network, the status to the user.

15. The computer system according to claim 13, wherein the output comprises an SQL query, a table schema, and data information.

16. The computer system according to claim 13, wherein determining a loss value for generated input data comprises:

receiving incomplete generated input data from a temporary generative model;

generating a plurality of remainder data to yield a plurality of completed generated input data;

evaluating each of the plurality of completed generated input data;

determining a reward value for each of the completed generated input data according to the evaluation;

determining an expectation of reward values according to the reward values for the plurality of completed generated input data as a loss function value; and updating temporary generative model parameters according to the loss function value.

17. The computer system according to claim 13, further comprising:

updating generative model parameters using temporary generative model parameters;

receiving complete input data from the generative model;

evaluating the complete input data using the discriminator model, yielding a loss function value; and updating the generative model parameters according to the loss function value.

* * * * *